(12) United States Patent
Yang

(10) Patent No.: US 11,711,434 B2
(45) Date of Patent: Jul. 25, 2023

(54) INFORMATION TRANSMISSION METHOD AND DEVICE

(71) Applicant: Advanced New Technologies Co., Ltd., Grand Cayman (KY)

(72) Inventor: Fan Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/810,462

(22) Filed: Mar. 5, 2020

(65) Prior Publication Data

US 2020/0213403 A1 Jul. 2, 2020

Related U.S. Application Data

(63) Continuation of application No. PCT/CN2018/111467, filed on Oct. 23, 2018.

(30) Foreign Application Priority Data

Dec. 12, 2017 (CN) .......................... 201711318171.9

(51) Int. Cl.
*H04L 67/141* (2022.01)
*H04L 67/562* (2022.01)

(52) U.S. Cl.
CPC .......... *H04L 67/141* (2013.01); *H04L 67/562* (2022.05)

(58) Field of Classification Search
CPC .......................... H04L 67/141; H04L 67/2809
(Continued)

(56) References Cited

U.S. PATENT DOCUMENTS

2014/0007211 A1* 1/2014 Yang ...................... H04L 63/08
726/7
2014/0032769 A1 1/2014 Boll et al.
(Continued)

FOREIGN PATENT DOCUMENTS

CN 1783790 6/2006
CN 102811261 12/2012
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Kevin S Mai
(74) *Attorney, Agent, or Firm* — Fish & Richardson P.C.

(57) ABSTRACT

One or more implementations of the present specification provide an information transmission method. Target information selected by a user of a first computing device is obtained by the first computing device. A unique identifier is obtained by the first computing device and from a second computing device, subsequent to the second computing device receiving the unique identifier from a server. The unique identifier is associated with the second computing device according to a mapping relationship. The unique identifier and the target information are sent to the server. The server identifies the second computing device associated with the unique identifier from the mapping relationship and forwards the target information to the second computing device.

18 Claims, 8 Drawing Sheets

(58) Field of Classification Search
USPC ........................................................ 709/227
See application file for complete search history.

(56) References Cited

U.S. PATENT DOCUMENTS

| | | | | |
|---|---|---|---|---|
| 2014/0059115 | A1* | 2/2014 | Zhang | H04L 65/1066 709/203 |
| 2014/0197232 | A1 | 7/2014 | Birkler et al. | |
| 2015/0178721 | A1* | 6/2015 | Pandiarajan | G06K 19/06037 705/75 |
| 2015/0304285 | A1 | 10/2015 | Carro | |
| 2016/0021148 | A1* | 1/2016 | Ijaz | H04L 67/104 709/206 |
| 2016/0219058 | A1 | 7/2016 | Kim | |
| 2016/0277339 | A1* | 9/2016 | Shi | H04L 67/20 |
| 2018/0322536 | A1* | 11/2018 | Zhang | G06Q 30/0277 |
| 2018/0356961 | A1* | 12/2018 | Lewis | G06Q 10/10 |
| 2020/0014977 | A1* | 1/2020 | Sato | H04N 21/482 |

FOREIGN PATENT DOCUMENTS

| | | |
|---|---|---|
| CN | 102857579 | 1/2013 |
| CN | 102868696 | 1/2013 |
| CN | 103220266 | 7/2013 |
| CN | 103841140 | 6/2014 |
| CN | 104125277 | 10/2014 |
| CN | 105187560 | 12/2015 |
| CN | 107172068 | 9/2017 |
| CN | 107295035 | 10/2017 |
| JP | 2014518597 | 7/2014 |
| KR | 20170003366 | 1/2017 |
| WO | WO 2005109820 | 11/2005 |
| WO | WO 2014036568 | 3/2014 |
| WO | WO 2015134771 | 9/2015 |
| WO | WO 2016145992 | 9/2016 |
| WO | WO 2017090459 | 6/2017 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Appln. No. PCT/CN2018/111467, dated Jan. 4, 2019, 8 pages (with partial English Translation).
PCT International Preliminary Report on Patentability in International Application No. PCT/CN2018/111467, dated Jun. 16, 2020, 7 pages (with partial English translation).

* cited by examiner

INFORMATION TRANSMISSION METHOD AND DEVICE

CROSS-REFERENCE TO RELATED APPLICATIONS

This application is a continuation of PCT Application No. PCT/CN2018/111467, filed on Oct. 23, 2018, which claims priority to Chinese Patent Application No. 201711318171.9, filed on Dec. 12, 2017, and each application is hereby incorporated by reference in its entirety.

TECHNICAL FIELD

The present disclosure relates to the field of network technologies, and in particular, to an information transmission method and device.

BACKGROUND

In daily life and work, there are many situations in which information needs to be transmitted between two devices, for example, a website, a picture or a text paragraph. In the case of information transmission between a handheld device and a personal computer, users sometimes need to open a link to a network address received in a mobile phone by using a computer. Transmission methods that can be used include, for example, entering the link to a network address directly on the computer or logging in to a client tool (e.g. a chat tool or a file transmission assistant) on both the computer and the handheld device, and sending the link to a web address to the computer through the client tool.

SUMMARY

In view of this, the present disclosure provides an information transmission method and device between two devices in a simpler way.

In particular, one or more implementations of the present specification are implemented by using the following technical solutions:

According to a first aspect, an information transmission method is provided, where the method is used to send target information in a local device to an opposite device, and the method includes: obtaining target information that is determined and selected by a user from information displayed on the local device, where the target information is to be transmitted to the opposite device for display; obtaining a unique identifier transmitted by the opposite device, where the unique identifier is sent by a server to the opposite device, and the server stores a mapping relationship between the unique identifier and the opposite device; and sending the unique identifier and the target information to the server, so that the server forwards the target information to the opposite device corresponding to the unique identifier.

According to a second aspect, an information transmission method is provided, where the method is used to forward the target information in the first device to the second device, and the method includes: establishing a connection to the second device based on a connection request sent by the second device; sending a unique identifier corresponding to the current connection to the second device, and storing a mapping relationship between the unique identifier and the second device; receiving the unique identifier and the target information that are sent by the first device, where the target information is obtained by the first device and to be displayed on the second device, and the target information is determined by a user by selecting from the information displayed on the first device; finding the corresponding second device based on the unique identifier and the mapping relationship; and sending the target information to the second device.

According to a third aspect, an information transmission device is provided, where the device is configured to transmit target information to an opposite device by a local device, and the device includes: an information acquisition module, configured to obtain target information that is determined and selected by a user from information displayed on the local device, where the target information is to be transmitted to the opposite device for display; an identifier acquisition module, configured to obtain a unique identifier transmitted by the opposite device, where the unique identifier is sent by a server to the opposite device, and the server stores a mapping relationship between the unique identifier and the opposite device; and an information sending module, configured to send the unique identifier and the target information to the server, so that the server forwards the target information to the opposite device corresponding to the unique identifier.

According to a fourth aspect, an information transmission device is provided, where the device is configured to send target information in the first device to the second device; and the device includes: a connection establishment module, configured to establish a connection to the second device based on a connection request sent by the second device; an identifier allocation module, configured to send a unique identifier corresponding to the current connection to the second device, and store a mapping relationship between the unique identifier and the second device; an information receiving module, configured to receive the unique identifier and the target information that are sent by the first device, where the target information is obtained by the first device and to be displayed on the second device, and the target information is determined by a user by selecting from the information displayed on the first device; and an information sending module, configured to find the corresponding second device based on the unique identifier and the mapping relationship, and send the target information to the second device.

According to a fifth aspect, an information transmission device is provided, where the device includes a memory, a processor, and a computer instruction that is stored in the memory and can run on the processor, and the processor implements the following steps when executing the instruction: obtaining target information that is determined and selected by a user from information displayed on a local device, where the target information is to be transmitted to an opposite device for display; obtaining a unique identifier transmitted by the opposite device, where the unique identifier is sent by a server to the opposite device, and the server stores a mapping relationship between the unique identifier and the opposite device; and sending the unique identifier and the target information to the server, so that the server forwards the target information to the opposite device corresponding to the unique identifier.

According to a sixth aspect, an information transmission device is provided, where the device includes a memory, a processor, and a computer instruction that is stored in the memory and can run on the processor, and the processor implements the following steps when executing the instruction: establishing a connection to the second device based on a connection request sent by the second device; sending a unique identifier corresponding to the current connection to the second device, and storing a mapping relationship between the unique identifier and the second device; receiving the unique identifier and the target information that are sent by the first device, where the target information is obtained by the first device and to be displayed on the second device, and the target information is determined by a user by selecting from the information displayed on the first device; finding the corresponding second device based on the unique identifier and the mapping relationship; and sending the target information to the second device.

In the information transmission method and device of one or more implementations of the present specification, the server is used as a transition party for information transmission between two devices. In addition, one device establishes a connection to the server, and the other device can transmit the information displayed on a local device to the server with a unique identifier corresponding to the connection, so that the server can know to which device the information is sent. This solution does not require the installation of certain client software on the device in advance or rely on other client software, thereby making it easier to transmit the information between two devices.

BRIEF DESCRIPTION OF DRAWINGS

To describe the technical solutions in one or more implementations or the existing technology of the present specification more clearly, the following briefly introduces the accompanying drawings required for describing the implementations or the existing technology. Apparently, the accompanying drawings in the following description are merely some of the implementations described in one or more implementations of the present specification. For ordinary technicians in this field, other drawings may be obtained from a person of ordinary skill in the art without creative efforts.

DESCRIPTION OF IMPLEMENTATIONS

To enable a person skilled in the art to better understand the technical solutions in one or more implementations of the present specification, the following clearly and comprehensively describes the technical solutions in one or more implementations of the present specification with reference to the accompanying drawings in one or more implementations of the present specification. Apparently, the described implementations are merely some rather than all of the implementations. Based on one or more implementations of the present specification, all other implementations obtained by a person of ordinary skill in the art without creative efforts shall fall within the scope of the present disclosure.

One or more implementations of the present specification provide an information transmission method, which can be used for transmitting information between two devices. In addition, assume that the two devices are the first device and the second device, a characteristic of information transmission between the two devices is that the first device obtains an identifier transmitted by the second device in a certain way, and can automatically triggers the second device to start displaying certain information on the first device. For example, the first device can obtain an identifier in a two-dimensional code displayed on the second device by scanning the code, and automatically trigger the second device to start displaying a link address to a web on the first device.

Figure 1:
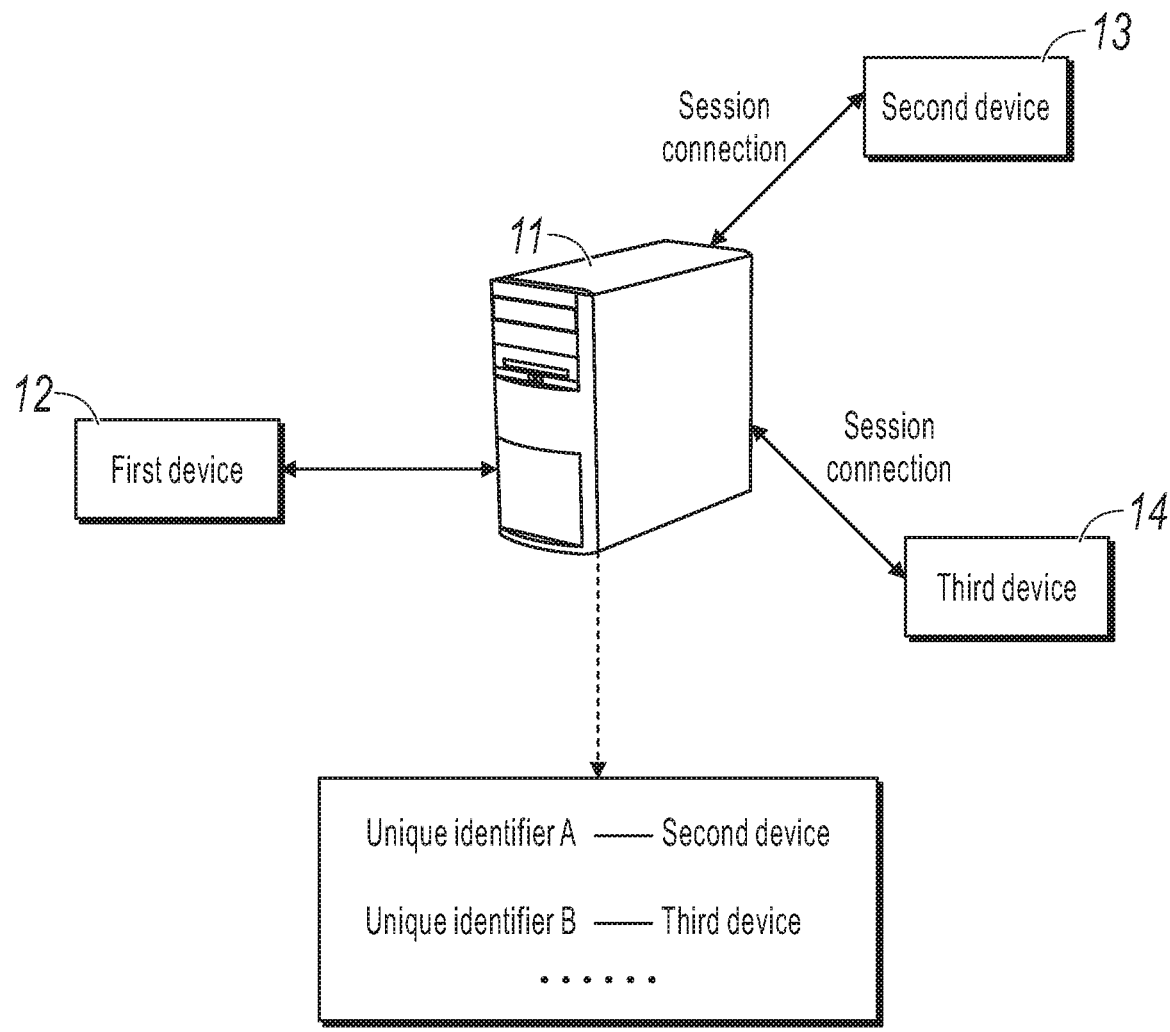
FIG. 1 is system architecture illustrating information transmission, according to one or more implementations of the present specification.

FIG. 1 illustrates system architecture for information transmission. As shown in FIG. 1, the system can include information transmission server 11, first device 12, and second device 13. Forms of first device 12 and second device 13 are not limited. For example, first device 12 can be a handheld device, and second device 13 can be a personal computer (PC). When first device 12 needs to transmit some information in first device 12 to second device 13, for example, first device 12 can transmit part of link addresses in the web pages to second device 13 to open the link addresses in second device 13. As shown in FIG. 1, a connection can be established between second device 13 and information transmission server 11. In addition, first device 12 can send information that is to be transmitted to information transmission server 11, where information transmission server 11 is used as a transition party, and sends the information to second device 13 by using the established connection.

In addition, information transmission server 11 can also be used as a transition party for information transmission between multiple groups of devices. For example, third device 14 shown in FIG. 1 can also establish a connection to information transmission server 11 and receive information forwarded by information transmission server 11. Then, when first device 12 sends the information to second device 13, a "unique identifier" can be used to accurately distinguish the receiving end from other receiving ends of the information. To be specific, information transmission server 11 can establish a unique identifier corresponding to each connection. For example, the connection between second device 13 and information transmission server 11 corresponds to one unique identifier, while the connection between third device 14 and information transmission server 11 corresponds to another unique identifier. Information transmission server 11 can store mapping relationships between different unique identifiers and connections, and know which opposite device is corresponding to a unique identifier based on the mapping relationship. For example, unique identifier A corresponds to the second device, and unique identifier B corresponds to the third device. In addition, when sending information that is to be transmitted to information transmission server 11, first device 12 also needs to include the unique identifier, so that information transmission server 11 learns to which device the information is to be sent.

Further, the previous unique identifier can have the following characteristics: corresponding to an information transmission process, or corresponding to an identifier of one information transmission, where the information transmission is that the first device sends a certain piece of information to the second device. Examples illustrating applications of unique identifiers are as follows:

Still taking the first device and the second device as examples, assume that the second device requests to connect to a server (i.e. an information transmission server), the server can generate a unique ID corresponding to the current connection, and set a validity period T for the ID. See Table 1 below.

TABLE 1

Correlation information for unique identifier

| Unique identifier | Corresponding second device | Valid duration of identifier |
|---|---|---|
| ID | Second device 13 | T |

The following may then occur:

Case 1: The server can clear the unique identifier ID if the first device has not transmitted information to the second device during a validity period T.

Case 2: During a validity period T, first device 12 transmits a link address to second device 13, and the transmission is shorter than the validity period T. At this point the server still needs to clear the unique identifier ID because a message transmission process has been successfully executed.

If first device 12 needs to transmit another link address to second device 13 after transmitting the previous link address, the server can assign another unique identifier ID, and first device 12 also needs to obtain the another ID for another information transmission.

Figure 2:
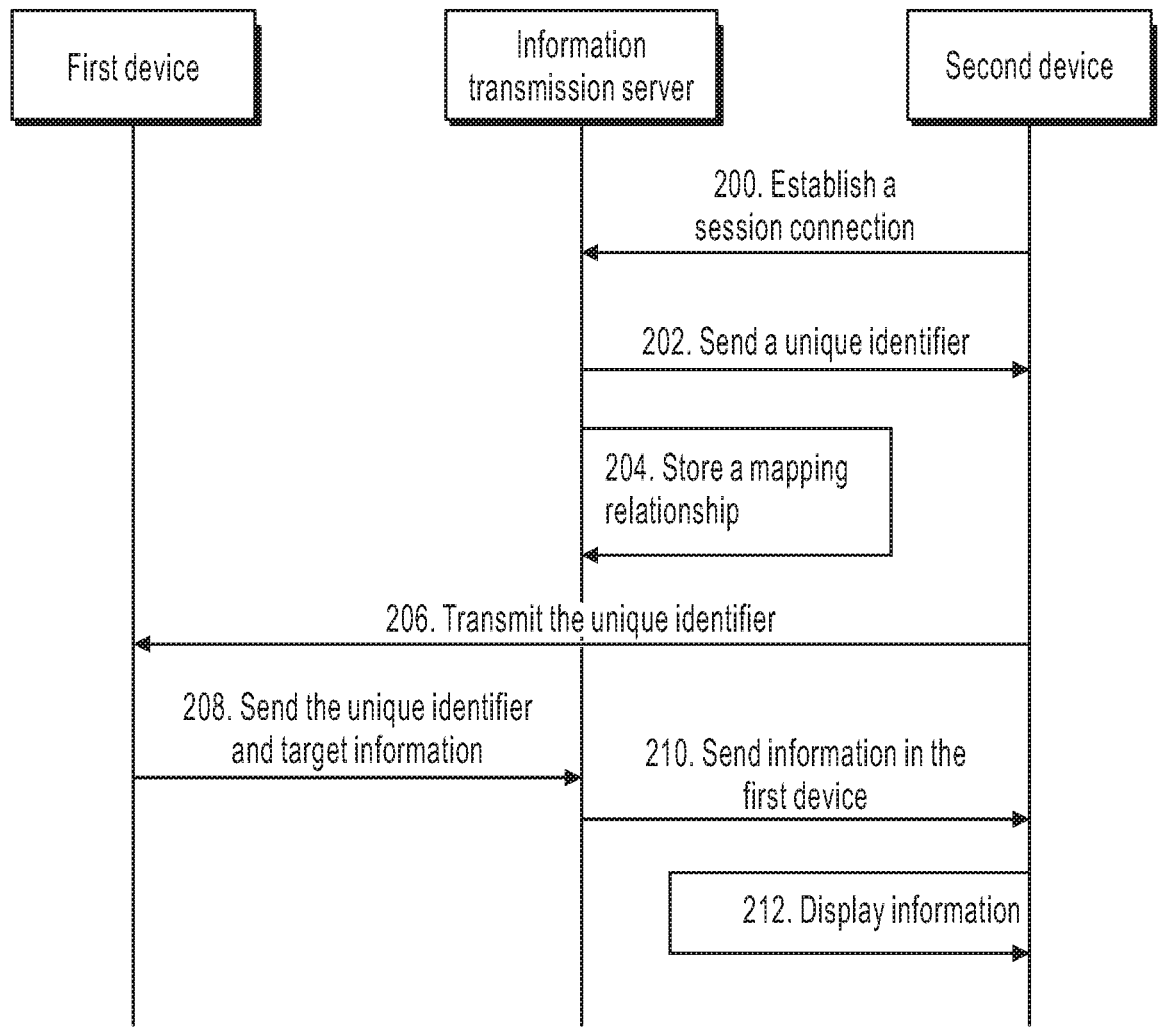
FIG. 2 is a flowchart illustrating an information transmission method, according to one or more implementations of the present specification.

On the basis of the system architecture shown in FIG. 1, FIG. 2 illustrates an information transmission method that implements information transmission between the first device and the second device by using the system architecture shown in FIG. 1. As shown in FIG. 2, the method can include the following steps:

In step 200, the second device establishes a connection to the information transmission server based on the address of the server.

In this step, the second device can send a connection request to the information transmission server based on the address of the server. The information transmission server can establish a connection to the second device based on the connection request.

In step 202, the second device receives the unique identifier that is allocated by the information transmission server and corresponds to the connection.

In this example, the information transmission server can assign a unique identifier that corresponds uniquely to the current connection and sends the unique identifier to the second device.

In step 204, the information transmission server stores the mapping relationship between the unique identifier and the second device. Alternatively, the information transmission server can restore the mapping relationship between the unique identifier and the connection established in step 200. However, the mapping relationship is stored to ultimately identify the second device corresponding to the connection based on the unique identifier, so as to know which device to transmit the information in the first device based on the unique identifier in the subsequent steps.

In step 206, the second device transmits the unique identifier to the first device in a predetermined information transmission method.

In this example, multiple information transmission methods can be used by the second device to transmit a unique identifier to the first device. For example, the second device can include a unique identifier in a two-dimensional code and display the two-dimensional code, and the first device scans the two-dimensional code to obtain the unique identifier. For another example, the second device can also send a unique identifier to the first device by using voiceprint transmission.

In step 208, the first device sends target information that is to be transmitted and the unique identifier to the information transmission server.

In this step, the first device can send target information that is to be transmitted in the first device, such as pictures, texts, or link addresses, to the information transmission server together with the unique identifier mentioned above.

In this example, the target information in the local device can be obtained by a user by selecting determined target information that is displayed on the local device.

For example, if the local device is a mobile phone, a user can browse web pages or chat on the mobile phone. When receiving a link address sent by a friend or seeing a text segment that the user is interested in, the user can copy and paste the content to a specified location (the specified location can be a certain function area in the mobile phone corresponding to the information transmission method in this example). For example, the specified location can be a certain input box of an application (APP) in the mobile phone.

Alternatively, when the mobile phone (or an APP in the mobile phone) detects that the user clicks the previous link address (this click is equivalent to a selection operation, or another method of selection operation can be used, for example, the user selects and right-clicks to send the previous link address to an opposite device), the link address corresponding to the click operation is automatically obtained as the target information that is to be transmitted. Of course, to avoid misoperation, the user is required to determine whether to send the link address to the opposite device after automatically obtaining the clicked link address.

In step 210, the information transmission server sends the target information to the second device corresponding to the unique identifier.

In this step, the information transmission server can obtain that the device corresponding to the unique identifier is the second device based on the mapping relationship stored in step 204, and transmit the target information sent by the first device to the second device. For example, a link address sent by the first device can be sent to the second device. Of course, the unique identifier can have a validity period and the information transmission server can determine that the unique identifier is valid before sending information to the second device or before the second device receiving the link address.

In step 212, the second device displays the target information. For example, the second device can open web pages or pictures corresponding to link addresses in the local browser.

In the information transmission method of this example, the information transmission server is used as a transition party for information transmission between two devices. In addition, one device establishes a connection to the information transmission server, and another device transmits the information with a unique identifier corresponding to the connection, so that the information transmission server can know to which device the information is sent. As such, the information is transmitted in the form of an instant connection between the device and the information transmission server without installing certain client software on the device in advance or relying on other client software, thereby making it easier to transmit the information between two devices. For example, the first device and the second device do not install the client software used for the same specific information transmission. Provided that the second device can establish a connection to the server, and the first device can obtain a unique identifier, the server can be used as a transition party for information transmission, thereby making it easier to forward the information.

The following describes an information transmission method in one or more implementations of the present specification by using a specific application scenario as an example. For example, two devices in this scenario can be a mobile phone and a personal computer (PC). Assume that a user wants to open a link address on the PC while browsing web pages on mobile phone, the link address needs to be transmitted from the mobile phone to the PC. In this case, the link address can be transmitted from the mobile phone to the PC by using the information transmission method of the present disclosure. In addition, in this example scenario, the unique identifier between the mobile phone and the PC can be transmitted by scanning a code. The mobile phone obtains the unique identifier by using a scanning tool to scan the two-dimensional code that contains the unique identifier and that is displayed on the PC. From a perspective of user operation, the transmission process can be as follows: The mobile phone scans the two-dimensional code on the PC, and automatically triggers the PC to open a link address on the mobile phone. The way to open the link address on the PC by scanning the code can be referred to as "reverse two-dimensional code scanning function".

Figure 3:
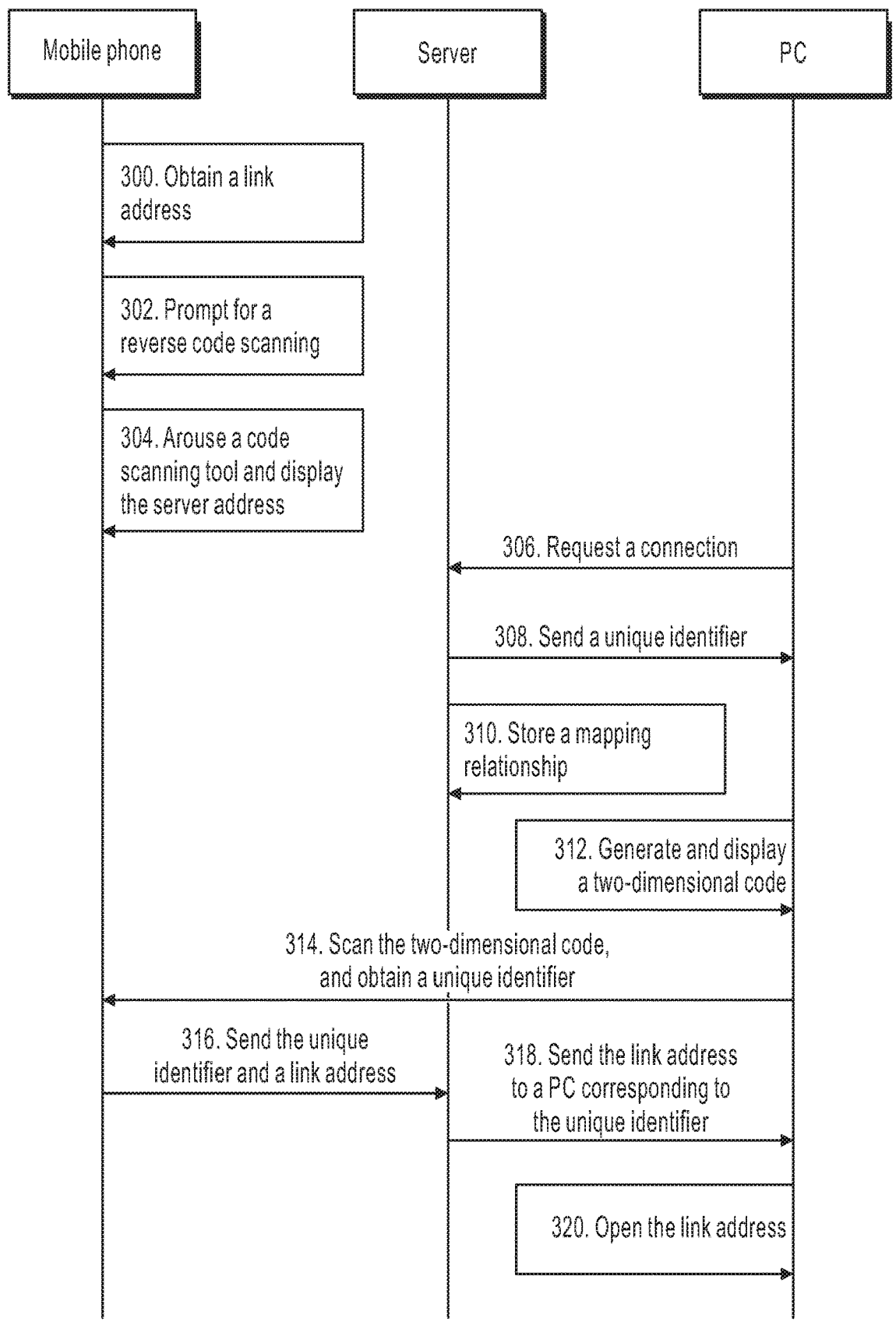
FIG. 3 is a flowchart illustrating an information transmission method, according to one or more implementations of the present specification.

FIG. 3 illustrates the process performed in the above scenario. As shown in FIG. 3, the scenario illustrates a method to open links, and the method can include the following steps. It is worthwhile to note that the implementation is not limited to the following sequence of steps:

In step 300, the mobile phone acquires the link address that needs to be opened on the PC.

For example, a user may need to open a link address when browsing pages on mobile phone, or receive a link address transmitted by another person in a chat tool on mobile phone. If the link address needs to be opened on the PC to browse and operate, the link address needs to be transmitted to the PC. In this example scenario, the user can click the previous link address to trigger the mobile phone to obtain the link address, or the user can right-click to open the link address on the PC. Both methods in the examples are equivalent to the mobile phone detecting a transmission instruction of predetermined format information sent by the user, which may be, for example, the link address, and the transmission indication is to transmit the information to the PC.

In addition, after obtaining the transmission indication, the mobile phone can use the obtained predetermined format information as the local information that is to be transmitted. Further, predetermined format information is not limited to link addresses, but can also be other information, such as text information, pictures, etc. Other information can also be obtained by presetting, right-click triggering or other ways.

In step 302, the mobile phone requires the user to determine whether to enter the reverse code scanning function to open the link address on the PC.

Figure 4:
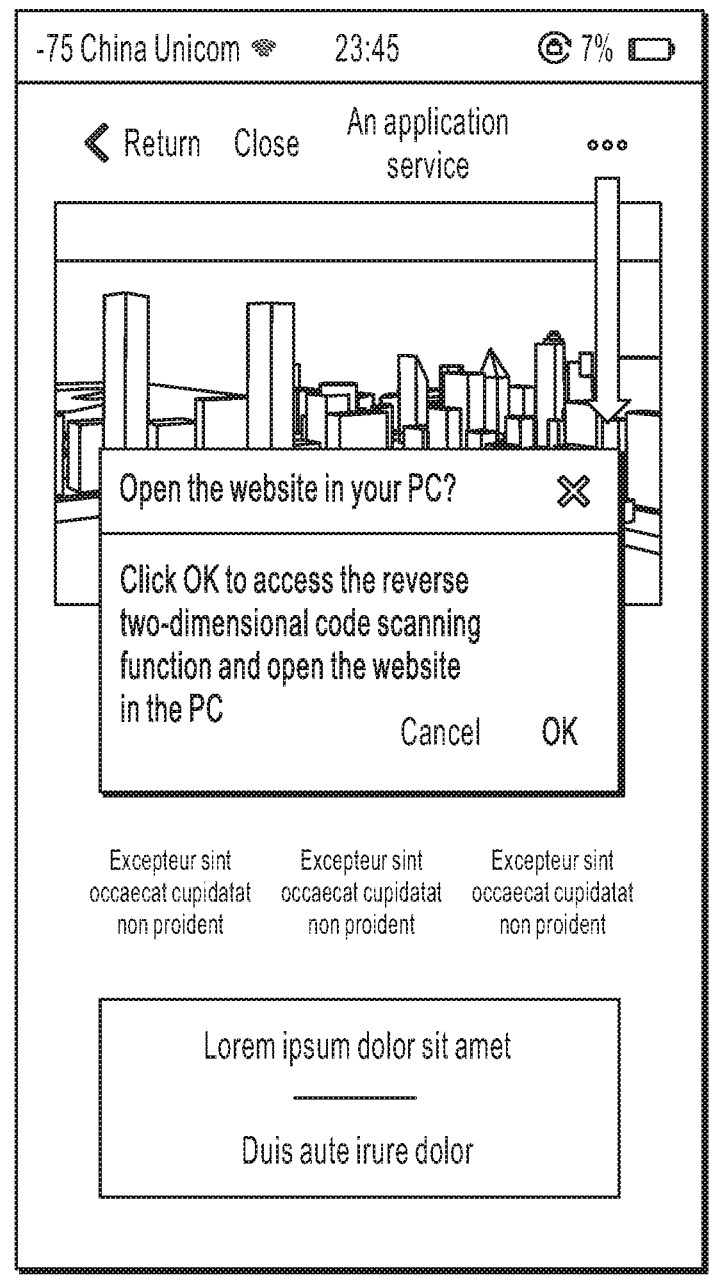
FIG. 4 is a schematic diagram illustrating a reminder that includes a two-dimensional code for reverse scanning, according to one or more implementations of the present specification.

For example, after a link address is obtained, the mobile phone can require the user to determine whether to perform a reverse scan. As shown in the example in FIG. 4, the mobile phone can require the user to determine whether to open the link address on the PC.

If the user clicks "ok", step 304 can be continued. If the user doesn't click "ok", the link address can be opened directly on the mobile phone for viewing.

In step 304, the mobile phone wakes the scanning tool and displays the server address that needs to be opened on the PC.

In this step, the mobile phone can wake a code scanning tool that is equivalent to an information acquisition tool and can be used to obtain a unique identifier by scanning a two-dimensional code on the PC in subsequent steps.

Figure 5:
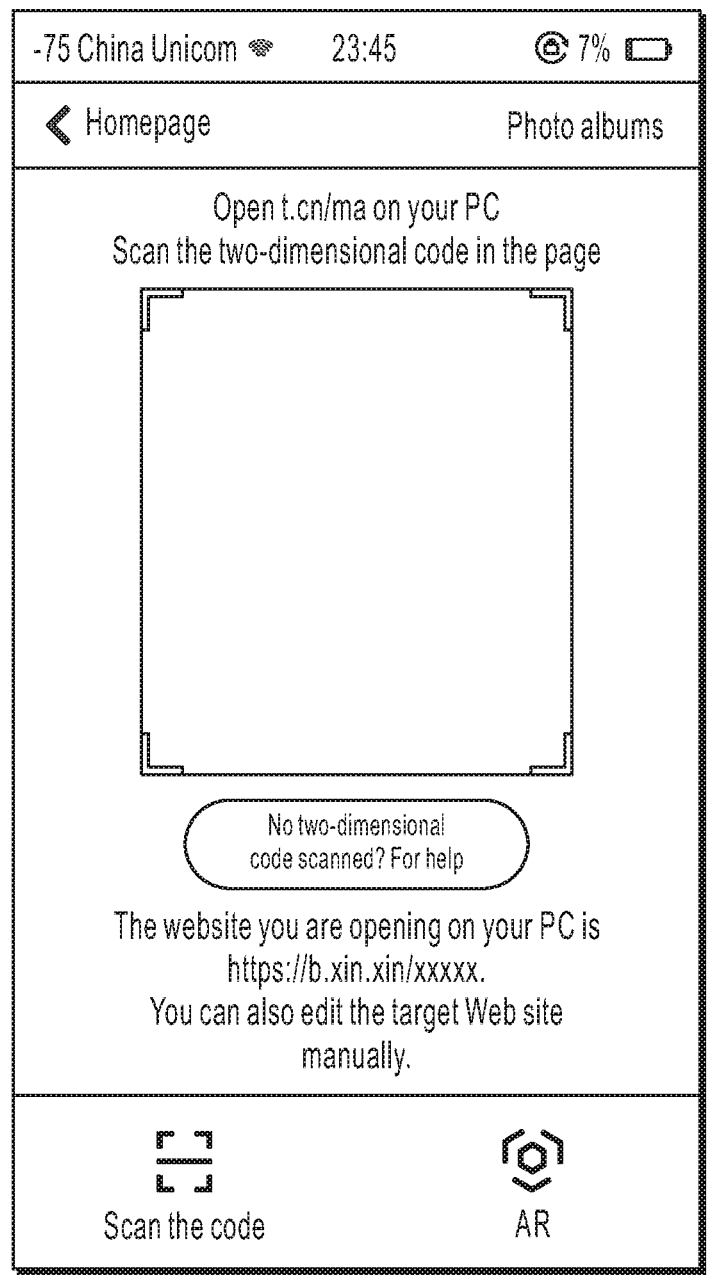
FIG. 5 is a schematic diagram illustrating starting a scanning two-dimensional code tool, according to one or more implementations of the present specification.

As shown in the example in FIG. 5, the mobile phone has started a code scanning tool and can also require the PC to connect to the server address of the information transmission server. The server address can be a fixed short website address, where the website address can be used to generate a fixed, short uniform resource locator (URL) that can be entered directly by the user by using short URL technologies. For example, the fixed short network address can be t.cn/ma. Users can be required to enter the fixed short network address on the PC, so that the PC connects to the information transmission server based on the network address.

In addition, as shown in FIG. 5, the mobile phone can also edit and modify the previous fixed short network address when starting the code scanning tool. Users can be required to determine whether the link address obtained automatically in step 300 is correct. If the link address is incorrect, the users can edit and modify the link address to ensure the correctness of the address of the information transmission server.

In this example, the notification for displaying the server address in FIG. 5 is used as an example. In other examples, when the server address is already known, the mobile phone can skip notification, and the address t.cn/ma can be entered directly on the PC. In addition, the server address can be added to favorites on the PC or made into a browser plug-in for convenience. Further, users can turn on the mobile phone to directly enter the code scanning page by using a code scanning tool that is waken by the mobile phone in this step instead of using a reverse code scanning function in step 302. In this case, the users can copy and paste the link address to the code scanning page or input the link address directly.

After waking the code scanning tool, the mobile phone waits to scan the two-dimensional code displayed on the PC in the following steps.

In step 306, the PC opens the server address in the browser to request a connection to the server. For example, a user can input t.cn/ma on the PC to request a connection to the information transmission server.

In step 308, the server assigns a unique identifier to the PC.

In this step, the information transmission server can establish a connection to the PC based on the connection request sent by the PC in step 306, and generate a unique identifier corresponding to the connection. At this time, the user has opened the fixed short network address in the browser of PC, and the PC page will interact with the information transmission server to generate a short unique ID, namely the unique ID as the communication ID of this interaction.

As shown in FIG. 3, the server in this step can send the unique identifier to the PC.

In step 310, the server stores the mapping relationships between unique identifiers and connections.

In this step, by storing the mapping relationships, the server can know to which PC device the unique identifier corresponds. The server may also store multiple groups of mapping relationships. Each group of mapping relationship includes a unique identifier and a corresponding PC device. In this case, the server can establish connections with multiple PCs, and be responsible for forwarding information to these PCs.

In step 312, the PC generates a two-dimensional code based on a unique identifier and displays the code.

Figure 6:
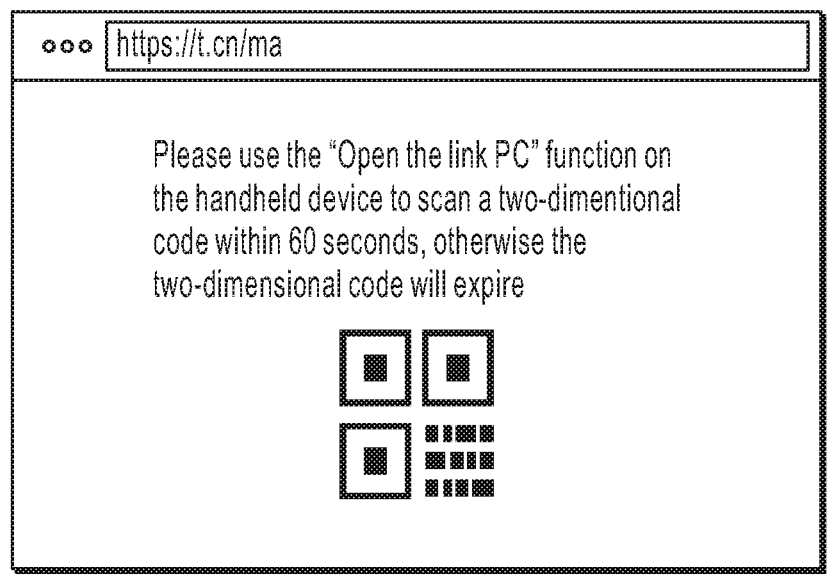
FIG. 6 is a schematic diagram illustrating displaying a two-dimensional code, according to one or more implementations of the present specification.

In this step, the PC can generate a two-dimensional code that includes a unique identifier. In addition, the PC displays the two-dimensional code. Referring to the example in FIG. 6, the PC displays the two-dimensional code and instructs the mobile phone to scan using the corresponding code scanning function.

In step 314, the mobile phone scans the two-dimensional code to obtain a unique identifier.

In this step, the mobile phone can scan the two-dimensional code displayed in step 312 by using the code scanning tool waken in step 304, parse the two-dimensional code, and obtain the unique identifier included in the two-dimensional code.

In other examples, methods of transmitting unique identifiers between the mobile phones and the PCs are not limited to the code scanning in this example, for example, the methods can include a voiceprint transmission method. In the voiceprint transmission, the PC can transmit the unique identifier included in the voiceprint information to the mobile phone. The mobile phone parses the voiceprint information to obtain the unique identifier.

In step 316, the mobile phone combines the unique identifier and the link address, and sends the unique identifier and the link address to the server.

In this step, the mobile phone can send the link address obtained in step 300 to the information transmission server together with the unique identifier obtained in step 314. After the transmission succeeds, the code scanning function of the mobile phone can be turned off to go back to the page previously operated by the user.

In step 318, the server sends the link address to the PC within the validity period of the unique identifier.

For example, the server can determine if the unique identifier expires after receiving the unique identifier and the link address transmitted by the mobile phone. If the unique identifier has expired, error messages can be displayed, and the unique identifier is not transmitted to the PC. If the unique identifier is still within the validity period, the PC device corresponding to the unique identifier can be found based on the mapping relationships stored in step 310, and the linked address is sent to the PC.

Figure 7:
FIG. 7 is a schematic diagram illustrating acquiring a link address, according to one or more implementations of the present specification.

In addition, in this step, the process that the server sends the link address to the PC can be actively obtained by the PC. For example, a browser of the PC can continuously request the server after generating a two-dimensional code, and try to obtain the link address transmitted by the mobile phone. In addition, the PC can also determine whether the unique identifier expires. If the unique identifier has expired, the PC stops obtaining the information sent by the information transmission server. In other words, the PC stops polling to obtain the link address. If the unique identifier is within the validity period, the previous link address can be obtained by polling request. After obtaining the link address, the browser of the PC can automatically parse the link address, and display an obtained link URL to the user, who can choose to cancel or open the link URL immediately, as shown in FIG. 7, which shows a schematic interface where the PC obtains the link address and prompts the user. If the PC determines that the link address is legal (if the PC determines that the link address is illegal, an error message can be displayed, and the link address will not be opened), and the user determines to open the link address, the browser automatically jumps to the target page corresponding to the link address and the PC process ends. Accordingly, the process of the information transmission server also ends, and the unique identifier used in this process can be cleared for the next request to arrive.

Figure 8:
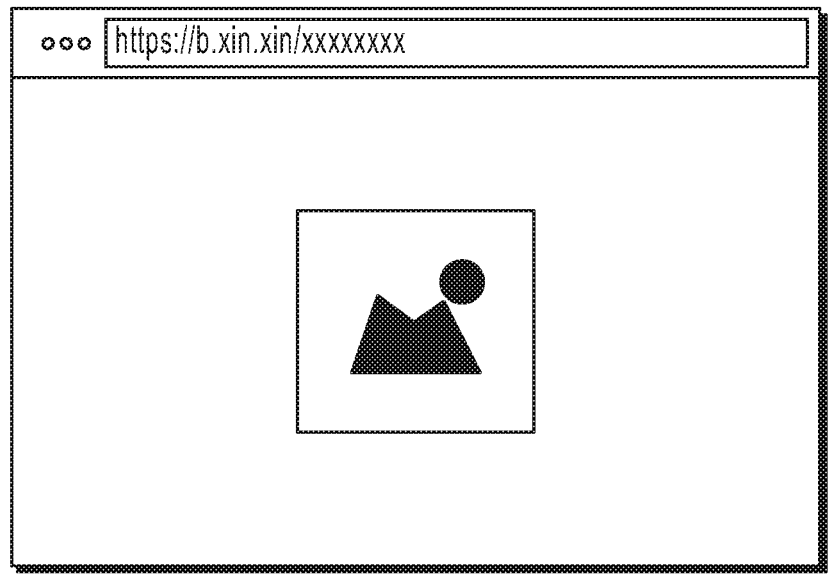
FIG. 8 is a schematic diagram illustrating opening a link address, according to one or more implementations of the present specification.

In step 320, the PC automatically opens the link address in the browser. As shown in FIG. 8, the PC can open the received link address b.xin.xin/end_of_patent.

In the link opening method of this example, devices that are used are not limited to the mobile phone and the PC. The solution is applicable as long as one of the devices has a two-dimensional code display function, and the other device has a camera code scanning function. In addition, the solution implements a method that the link address URL in the mobile phone can be transmitted back to the PC by using the mobile phone to scan the code displayed on the PC to trigger the PC to open the URL in the mobile phone automatically. The solution uses an interaction method that's recognized by public, simply open a fixed short link address on the PC, and scan the code through a handheld device. This solution systematically alleviates the problem to quickly open link address in mobile phone on PC end without relying on the specific account login software, greatly reduces the operation cost, and makes it fast and convenient to open link addresses.

Figure 9:
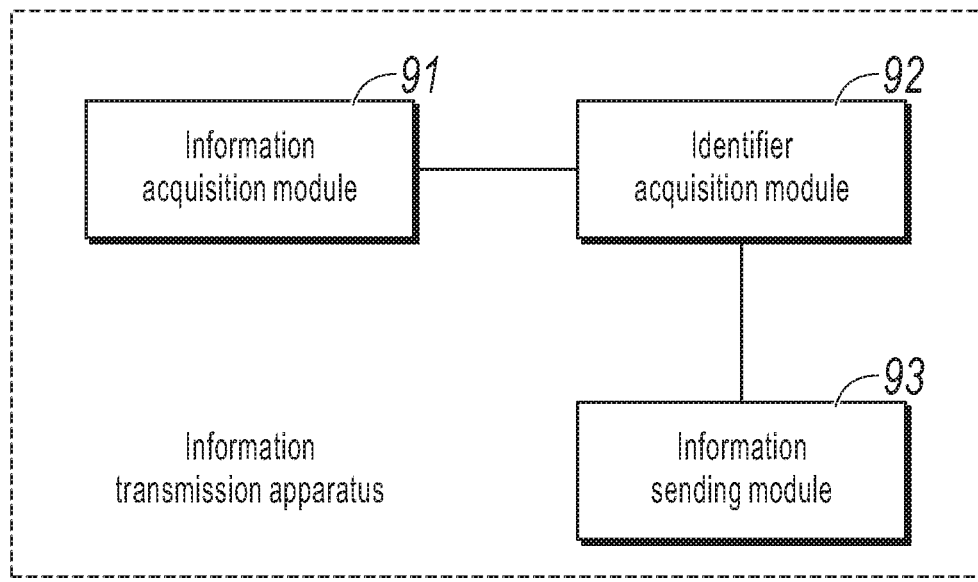
FIG. 9 is a schematic structural diagram illustrating an information transmission device, according to one or more implementations of the present specification.

To implement the previous information transmission method, one or more implementations of the present specification provide an information transmission device. For example, the device can be located in the device that is configured to send information. As shown in FIG. 9, the device can include an information acquisition module 91, an identifier acquisition module 92, and an information sending module 93.

The information acquisition module 91 is configured to obtain target information that is determined and selected by a user from information displayed on a local device, where the target information is to be transmitted to an opposite device for display.

The identifier acquisition module 92 is configured to obtain a unique identifier transmitted by the opposite device, where the unique identifier is sent by a server to the opposite device, and the server stores a mapping relationship between the unique identifier and the opposite device.

The information sending module 93 is configured to send the unique identifier and the target information to a server, so that the server forwards the target information to the opposite device corresponding to the unique identifier.

In one example, the identifier acquisition module 91 is configured to scan the two-dimensional code displayed on the opposite device by using a code scanning tool and parse the two-dimensional code to obtain the unique identifier included in the two-dimensional code.

In one example, the target information includes a link address or text information.

Figure 10:
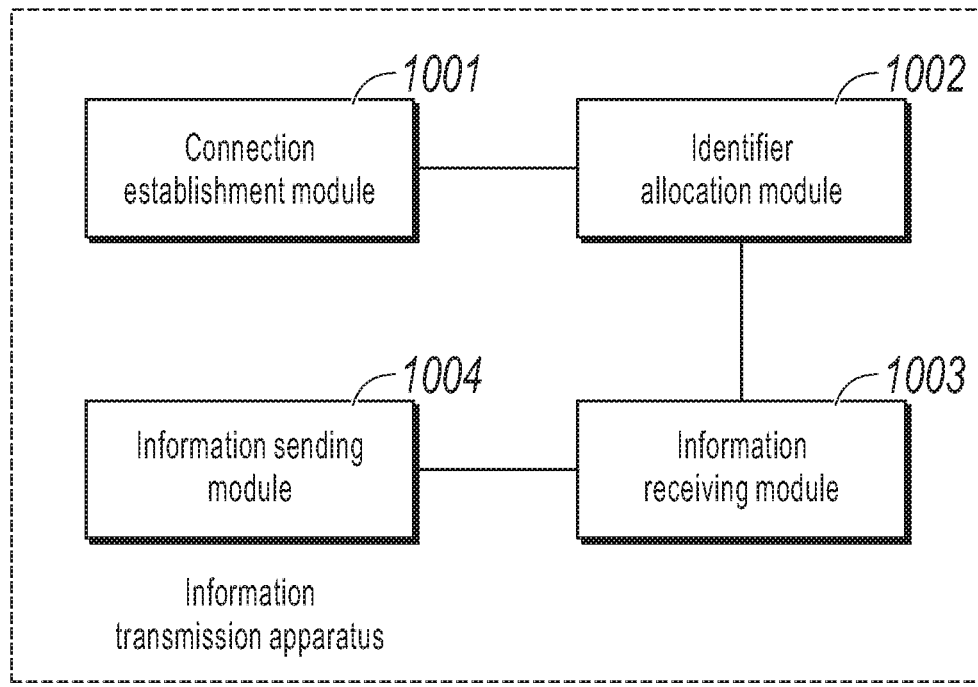
FIG. 10 is a structural diagram illustrating an information transmission device, according to one or more implementations of the present specification.

To implement the previous information transmission method, one or more implementations of the present specification provide an information transmission device. The device can be configured to send information transmitted by the first device to the second device. For example, the device can be located in the information transmission server that is responsible for forwarding information. As shown in FIG. 10, the device can include a connection establishment module 1001, an identifier allocation module 1002, an information receiving module 1003, and an information sending module 1004.

The connection establishment module 1001 is configured to establish a connection to the second device based on a connection request sent by the second device.

The identifier allocation module 1002 is configured to send a unique identifier corresponding to the current connection to the second device, and store a mapping relationship between the unique identifier and the second device.

The information receiving module 1003 is configured to receive the unique identifier and the target information that are sent by the first device, where the target information is obtained by the first device and to be displayed on the second device, and the target information is determined by a user by selecting from the information displayed on the first device.

The information sending module 1004 is configured to find the corresponding second device based on the unique identifier and the mapping relationship, and send the target information to the second device.

For the convenience of description, the above devices are described separately in terms of their functions. Of course, during implementation of one or more implementations of the present specification, the functions of each module can be implemented in at least one of software or hardware.

The execution sequence of the steps in the process shown in the previous method implementations is not limited to the sequence in the flowchart. In addition, the description of each step can be implemented in the form of software, hardware, or a combination of software and hardware. For example, a person skilled in the art can present the description of each step in the form of software code, namely computer executable instructions capable of implementing logical functions corresponding to the steps. When implemented in a software method, the executable instructions can be stored in a memory and executed by a processor in the device.

For example, in response to the previous methods, one or more implementations of the present specification provide an information transmission device that can include a processor, a memory, and a computer instruction that is stored in the memory and can run on the processor, the processor executes the instructions to implement the following steps: obtaining target information that is determined and selected by a user from information displayed on a local device, where the target information is to be transmitted to an opposite device for display; obtaining a unique identifier transmitted by the opposite device, where the unique identifier is sent by a server to the opposite device, and the server stores a mapping relationship between the unique identifier and the opposite device; and sending the unique identifier and the target information to the server, so that the server forwards the target information to the opposite device corresponding to the unique identifier.

For example, in response to the previous methods, one or more implementations of the present specification provide an information transmission device that can include a processor, a memory, and a computer instruction that is stored in the memory and can run on the processor, the processor executing the instructions to implement the following steps: establishing a connection to the second device based on a connection request sent by the second device; sending a unique identifier corresponding to the current connection to the second device, and storing a mapping relationship between the unique identifier and the second device; receiving the unique identifier and the target information that are sent by the first device, where the target information is obtained by the first device and to be displayed on the second device, and the target information is determined by a user by selecting from the information displayed on the first device; finding the corresponding second device based on the unique identifier and the mapping relationship; and sending the target information to the second device.

The devices or modules illustrated in the previous implementations can be implemented by computer chips, entities, or products having a certain function. A typical implementation device can be a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of these devices.

A person skilled in the art should understand that one or more implementations of the present specification can be provided as methods, systems, or computer program products. As such, one or more implementations of the present specification can use the form of complete hardware implementations, complete software implementations, or implementations incorporating software and hardware. Further, one or more implementations of the present specification can use the form of computer program products implemented on one or more computer-usable storage media (including but not limited to disk storage, CD-ROM, optical storage, etc.) containing computer-usable program code.

These computer program instructions can also be stored in computer readable memories that can direct computers or other programmable data processing devices to work in particular methods, so that instructions stored in the computer readable memories produce manufactures that include instruction devices that implement the functions specified in at least one of process of the flowchart or block of the block diagram.

These computer program instructions can also be loaded onto computers or other programmable data processing devices so that a series of operational steps are performed on the computers or other programmable devices to produce computer-implemented process, which can be executed on the computers or other programmable devices. The instructions provide steps for implementing the functions specified in at least one of the flowcharts or blocks of the block diagrams.

It is also worthwhile to note that the terms "include", "comprise" or any other variant thereof are intended to cover non-exclusive inclusion, so that processes, methods, products or equipment that include a set of elements include not only those elements but also other elements that are not explicitly listed, or elements inherent in such processes, methods, products or equipment without more restrictions, the elements restricted by the statement "includes a . . . " do not exclude the existence of other identical elements in the process, method, product or equipment that includes the elements.

One or more implementations of the present specification can be described in the general context of computer executable instructions executed by computers, such as program modules. In general, program modules include routines, programs, objects, components, and data structures that perform specific tasks or implement specific abstract data types. One or more implementations of the present specification can also be practiced in distributed computing environments where tasks are performed by remote processing devices connected through a communications network. In distributed computing environments, program modules can be located in local and remote computer storage media, including storage devices.

Each implementation of the present specification is described in a progressive method, the same or similar parts between the implementations are referred to each other, and each implementation focuses on differences from other implementations. In particular, for the implementations of server devices, the description is relatively simple because the implementations of server devices are basically similar to the method implementations. For the related parts, refer to the partial description of the method implementations.

The specific implementations of the present specification are described above. Other implementations fall within the scope of the appended claims. In some cases, the actions or steps described in the claims can be performed in different order than in the implementations and can still achieve the desired results. In addition, the process depicted in the accompanying drawings does not necessarily require the particular sequence or consecutive sequence shown to achieve the desired results. In some implementations, multi-task processing and parallel processing are also possible or may be advantageous.

The previous descriptions are merely preferred implementations of one or more implementations of the present specification, and are not intended to limit the present disclosure. Any modification, equivalent replacement, improvement, etc., made within the spirit and principles of the present disclosure shall be included within the scope of the present disclosure.

The invention claimed is:

1. A computer-implemented method comprising:
obtaining, by a data sending computing device, target information that is selected by a user of the data sending computing device, and that is to be transmitted from the data sending computing device to a data receiving computing device;
selecting, by the data sending computing device, a third-party, information transmission server through which the selected target information is to be transmitted to the data receiving computing device and that is to assign a unique identifier to the data receiving computing device;
after the data sending computing device has selected the third-party, information transmission server, providing, for output by the data sending computing device, an instruction on a user interface that instructs the user to input an address of the third-party, information transmission server at the data receiving computing device, such that the data receiving computing device connects to the third-party, information transmission server whose address the user interface of the data sending computing device instructed to input at the data receiving computing device to initiate assignment of a unique identifier to the data receiving computing device;
obtaining, by a scanning tool of the data sending computing device, a code that is displayed on the data receiving computing device;
decoding, by the data sending computing device and from the code, the unique identifier corresponding to the data receiving computing device that (i) the third-party, information transmission server selected by the data sending computing device and with whom the data sending computing device is to transmit the target information has previously associated with the data receiving computing device after the data receiving computing device connected to the third-party, information transmission server, and (ii) the data receiving computing device has encoded in the code; and
transmitting, by the data sending computing device, the unique identifier and the target information to the third-party, information transmission server for further transmission, by the third-party, information transmission server, to the data receiving computing device that is associated with the unique identifier.

2. The computer-implemented method of claim 1, wherein the target information comprises a link address.

3. The computer-implemented method of claim 1, wherein obtaining the target information selected by the user of the data sending computing device comprises:
copying the target information; and
pasting the target information to a specific location displayed on the data sending computing device.

4. The computer-implemented method of claim 1, wherein decoding the unique identifier comprises:
scanning, by the scanning tool of the data sending computing device, a two-dimensional code displayed on the data receiving computing device;
parsing the two-dimensional code to generate a parsed code; and
determining the unique identifier from the parsed code.

5. The computer-implemented method of claim 1, wherein decoding the unique identifier comprises:
obtaining voiceprint information transmitted by the data receiving computing device in a voiceprint transmission method;
parsing the voiceprint information to generate parsed information; and
determining the unique identifier from the parsed information.

6. The computer-implemented method of claim 1, wherein the data sending computing device is a handheld device and the data receiving computing device is a personal computer.

7. A non-transitory, computer-readable medium storing one or more instructions executable by a computer system to perform operations comprising:
obtaining, by a data sending computing device, target information that is selected by a user of the data sending computing device, and that is to be transmitted from the data sending computing device to a data receiving computing device;
selecting, by the data sending computing device, a third-party, information transmission server through which the selected target information is to be transmitted to the data receiving computing device and that is to assign a unique identifier to the data receiving computing device;
after the data sending computing device has selected the third-party, information transmission server, providing, for output by the data sending computing device, an instruction on a user interface that instructs the user to input an address of the third-party, information transmission server at the data receiving computing device, such that the data receiving computing device connects to the third-party, information transmission server whose address the user interface of the data sending computing device instructed to input at the data receiving computing device to initiate assignment of a unique identifier to the data receiving computing device;

obtaining, by a scanning tool of the data sending computing device, a code that is displayed on the data receiving computing device;

decoding, by the data sending computing device and from the code, the unique identifier corresponding to the data receiving computing device that (i) the third-party, information transmission server selected by the data sending computing device and with whom the data sending computing device is to transmit the target information has previously associated with the data receiving computing device after the data receiving computing device connected to the third-party, information transmission server, and (ii) the data receiving computing device has encoded in the code; and transmitting, by the data sending computing device, the unique identifier and the target information to the third-party, information transmission server for further transmission, by the third-party, information transmission server, to the data receiving computing device that is associated with the unique identifier.

8. The non-transitory, computer-readable medium of claim 7, wherein the target information comprises a link address.

9. The non-transitory, computer-readable medium of claim 7, wherein obtaining the target information selected by the user of the data sending computing device comprises:
copying the target information; and
pasting the target information to a specific location displayed on the data sending computing device.

10. The non-transitory, computer-readable medium of claim 7, wherein decoding the unique identifier comprises:
scanning, by the scanning tool of the data sending computing device, a two-dimensional code displayed on the data receiving computing device;
parsing the two-dimensional code to generate a parsed code; and
determining the unique identifier from the parsed code.

11. The non-transitory, computer-readable medium of claim 7, wherein decoding the unique identifier comprises:
obtaining voiceprint information transmitted by the data receiving computing device in a voiceprint transmission method;
parsing the voiceprint information to generate parsed information; and
determining the unique identifier from the parsed information.

12. The non-transitory, computer-readable medium of claim 7, wherein the data sending computing device is a handheld device and the data receiving computing device is a personal computer.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
obtaining, by a data sending computing device, target information that is selected by a user of the data sending computing device, and that is to be transmitted from the data sending computing device to a data receiving computing device;
selecting, by the data sending computing device, a third-party, information transmission server through which the selected target information is to be transmitted to the data receiving computing device and that is to assign a unique identifier to the data receiving computing device;
after the data sending computing device has selected the third-party, information transmission server, providing, for output by the data sending computing device, an instruction on a user interface that instructs the user to input an address of the third-party, information transmission server at the data receiving computing device, such that the data receiving computing device connects to the third-party, information transmission server whose address the user interface of the data sending computing device instructed to input at the data receiving computing device to initiate assignment of a unique identifier to the data receiving computing device;
obtaining, by a scanning tool of the data sending computing device, a code that is displayed on the data receiving computing device;
decoding, by the data sending computing device and from the code, the unique identifier corresponding to the data receiving computing device that (i) the third-party, information transmission server selected by the data sending computing device and with whom the data sending computing device is to transmit the target information has previously associated with the data receiving computing device after the data receiving computing device connected to the third-party, information transmission server, and (ii) the data receiving computing device has encoded in the code; and
transmitting, by the data sending computing device, the unique identifier and the target information to the third-party, information transmission server for further transmission, by the third-party, information transmission server, to the data receiving computing device that is associated with the unique identifier.

14. The computer-implemented system of claim 13, wherein the target information comprises a link address.

15. The computer-implemented system of claim 13, wherein obtaining the target information selected by the user of the data sending computing device comprises:
copying the target information; and
pasting the target information to a specific location displayed on the data sending computing device.

16. The computer-implemented system of claim 13, wherein decoding the unique identifier comprises:
scanning, by the scanning tool of the data sending computing device, a two-dimensional code displayed on the data receiving computing device;
parsing the two-dimensional code to generate a parsed code; and
determining the unique identifier from the parsed code.

17. The computer-implemented system of claim 13, wherein decoding the unique identifier comprises:

obtaining voiceprint information transmitted by the data receiving computing device in a voiceprint transmission method;

parsing the voiceprint information to generate parsed information; and determining the unique identifier from the parsed information.

18. The computer-implemented system of claim 13, wherein the data sending computing device is a handheld device and the data receiving computing device is a personal computer.

* * * * *